United States Patent [19]

Connolly

[11] 4,196,885

[45] Apr. 8, 1980

[54] ADJUSTABLE FLOW CONTROL

[75] Inventor: Joseph R. Connolly, Geneva, Ill.

[73] Assignee: Eaton Corporation, Cleveland, Ohio

[21] Appl. No.: 910,927

[22] Filed: May 30, 1978

[51] Int. Cl.$^2$ .................... F16K 35/00; F16K 31/50
[52] U.S. Cl. .................................. 251/90; 251/268
[58] Field of Search ............... 251/89, 90, 95, 266, 251/267, 268, 318, 121, 270

[56] References Cited

U.S. PATENT DOCUMENTS

| | | | |
|---|---|---|---|
| 272,863 | 2/1883 | Douglas | 251/266 |
| 1,048,198 | 12/1912 | Mueller | 251/89 |
| 1,794,442 | 3/1931 | Cannon | 251/267 |
| 2,341,411 | 2/1944 | Ojalvo | 251/266 |
| 3,327,992 | 6/1967 | Billeter et al. | 251/267 |
| 3,409,271 | 11/1968 | Kallenbach | 251/266 |
| 3,614,059 | 10/1971 | Rothauser | 251/267 |
| 4,074,697 | 2/1978 | Saether | 251/268 |

FOREIGN PATENT DOCUMENTS

| | | | |
|---|---|---|---|
| 1171764 | 1/1959 | France | 251/268 |
| 1245047 | 9/1971 | United Kingdom | 251/268 |

*Primary Examiner*—Martin P. Schwadron
*Assistant Examiner*—G. L. Walton
*Attorney, Agent, or Firm*—R. J. McCloskey; E. Crist; R. A. Johnston

[57] ABSTRACT

An adjustable flow control valve having a rectangular flow control member selectively positionable within a fluid passageway. The flow control member is mounted transversely to the flow passageway in a guide slot integrally formed in the valve housing with the longitudinal edges of the control member extending outwardly from the slot. A closed end cylindrical adjustment nut having a tubular portion surrounding one end of the mounted control member is guided for rotation in a housing bore. The internal diameter of the adjustment nut is threaded and engages corresponding external threads located on the longitudinal edges of the rectangular flow control member. Selective rotation of the adjustment nut is effective for positioning the flow control member into the fluid passageway transversely to the direction of fluid flow therethrough, thereby varying the effective fluid flow area. The adjustment nut is fluidly sealed to the valve by a seal ring provided between the outer diameter of the adjustment nut and the guide bore in the valve housing.

6 Claims, 5 Drawing Figures

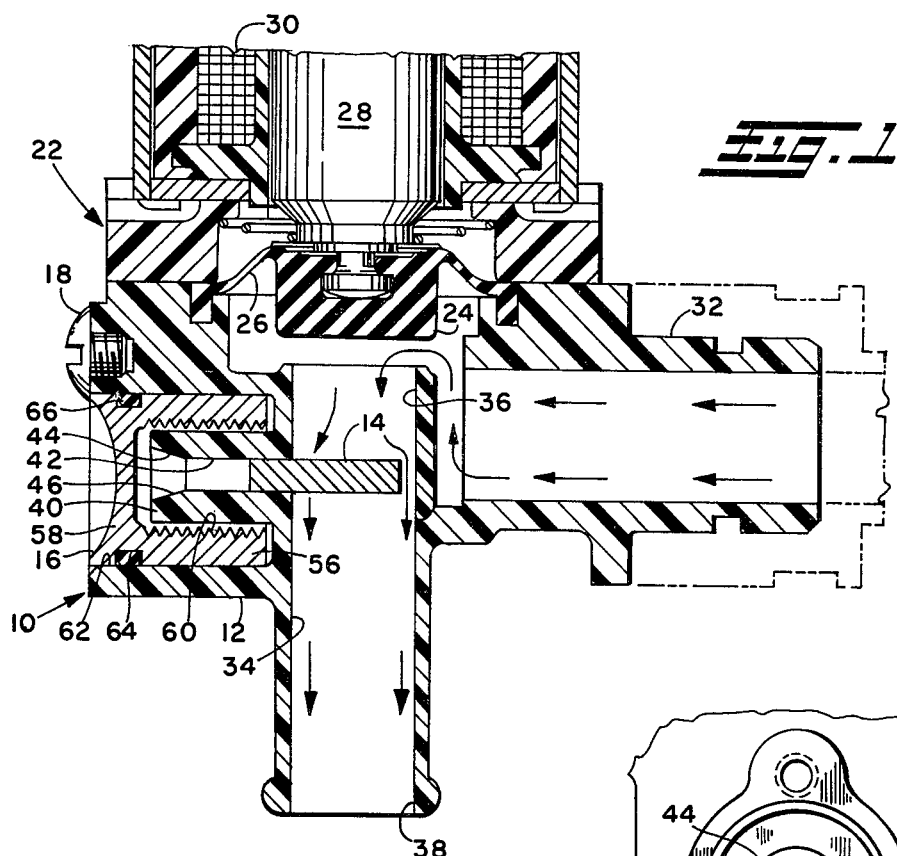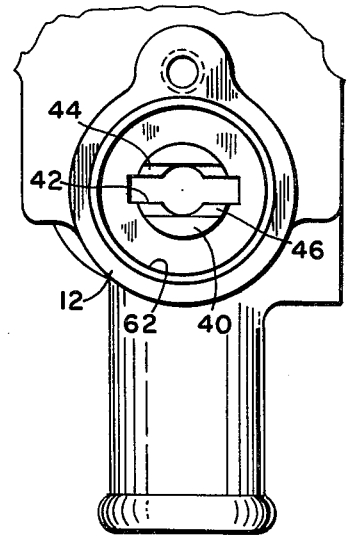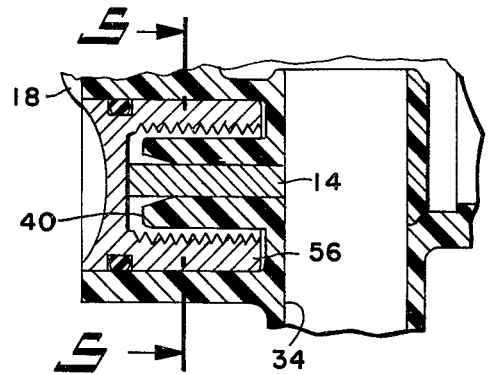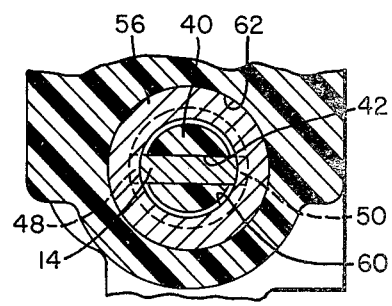

ADJUSTABLE FLOW CONTROL

FIELD OF THE INVENTION

The invention relates to adjustable flow control valves for use in appliances, hydraulic systems, and related fluid control systems which require fine flow adjustment.

DESCRIPTION OF THE PRIOR ART

An externally adjustable flow control device presently widely used incorporates a stem or flow member which is permanently disposed in the fluid passageway and adjustable between only two positions. The gate or flow member has a flat surface either directly obstructing passage of fluid flow or located 90° therefrom so that the edge of the flat gate member presents a minimal obstruction to fluid flow. The nature of the adjustable structure of this valve allows for setting in only one of the two positions described.

Another known technique used for achieving flow control, especially in appliance systems, is the use of resilient flow control washers disposed along the fluid conduit. Although flow control washers provide a constant downstream flow rate, they lack an external adjustment feature.

Another commonly used device incorporates a threaded stainless steel plug sealed to the valve housing by an O-ring. Devices of this kind are prone to mineral deposit build-up from tap water resulting in leakage and jamming.

SUMMARY OF THE INVENTION

In the present invention, a threaded connection between a rotatable, axially stationary adjustment nut and a rectangular flat control member permits infinite positional adjustment of the control member within the fluid passageway of the flow control valve thereby providing precise adjustment of the flow rate. This fine adjustment feature of the invention is achieved with a minimal number of component parts by integrally molding a slotted projection into the valve housing which functions as a guide surface for the control member. A second guide surface is concentrically located around the guide slot in the form of a bore also integrally molded into the housing. The adjustment nut is rotatably received within the bore guide surface and nests over the guide slot, thereby conserving and minimizing the axial space required for the valve. The nested arrangement also permits the control member to be retracted from its forwardmost position within the fluid passageway to a withdrawn position in which the control member is entirely contained within the space of the adjustment nut, thereby permitting substantially unobstructed flow through the valve.

Another feature of the invention includes a locking set screw which frictionally establishes the angular position of the adjusting nut by exerting an axial force thereon and forcing the adjusting nut into frictional engagement with the bottom surface of the guide bore.

A further feature of the invention includes a seal ring mounted in an annular groove formed on the exterior surface of the adjusting nut near its closed end and in sealing engagement against the adjustment nut and the guide bore surface. The location of the seal ring eliminates the need for providing a seal between the control member and the guide slot. Fluid is then free to enter the area around the guide slot and the inside of the adjustment nut without detrimental effect upon the operation of the valve.

BRIEF DESCRIPTION OF THE DRAWINGS

FIG. 1 is an elevation view in section of the invention;

FIG. 2 is a side view of the valve housing illustrating the guide surfaces;

FIG. 3 is a side elevation view of the control member;

FIG. 4 is a partial view showing the control member in a fully retracted position; and, FIG. 5 is a partial cross-sectional view taken along lines 5—5 of FIG. 4 showing the control member in threaded engagement with portions of the valve housing.

DETAILED DESCRIPTION

Referring now to FIG. 1, a flow control valve is indicated generally by reference numeral 10 and includes a housing 12, a control member 14, an adjustment nut 16, a locking and retaining screw 18, and a seal ring 20.

The flow control valve 10 is shown in association with a solenoid operated valve with the cover partially broken away and indicated generally by reference numeral 22. Solenoid valve 22, forming no part of this invention, includes, by way of illustration, a valve member 24 shown in the open position in FIG. 1, a diaphragm 26, an armature 28, and an electrical coil 30. The member 24 and diaphragm are disposed within housing 12 having fluid inlet conduit 32 integrally molded therewith.

An integral fluid passageway 34 is also defined by housing 12 and includes an inlet 36 and an outlet 38. Flow through the control valve, illustrated by FIG. 1, follows the path indicated by the black arrows.

A tubular projection 40 is defined by housing 12 and has a slot 42 formed therein which is aligned substantially transversely with respect to fluid passageway 34. Slot 42 extends longitudinally an amount sufficient to permit portions of control member 14 to be received in and guided freely therein. Slot 42 is also designated as a first guide surface. Tapered surfaces 44 and 46 are formed adjacent the outer edges of projection 40 and provide a lead-in for ease of assembly of control member 14 in slot 42.

The control member preferably has a generally flat rectangular configuration with the corners of one of the shorter sides chamfered. The control member also has a generally rectangular configuration when sectioned transversely of its longer sides.

Referring now to FIG. 3, edges 48 and 50 of the longer sides of control member 14 are threaded and terminate in chamfered portions 52 and 54 respectively in order to permit deeper extension of control member 14 in passageway 34 before abutting against the internal surface thereof.

Adjustment nut 16 includes a tubular portion 56 terminating in a closed end portion 58. A screwdriver slot 59, shown from the side in FIG. 1, is provided in the left hand face of nut 16. An internal thread 60 is formed on the internal diameter of tubular portion 56 for engagement with threaded edges 48 and 50 of control member 14. Referring now to FIG. 5 the width of control member 14 exceeds the outer diameter of tubular projection 40 by an amount sufficient to permit threaded edges 48 and 50 to engage internal thread 60.

In the presently preferred practice of the invention, control member 14, adjustment nut 16, and housing 12 are molded from a nonporous polymer material which resists tap water mineral deposit build-up which has been found to often foul previously known metallic devices. A material found to be particularly suitable is polysulfone.

A cylindrical bore 62, also designated as a second guide surface, is preferably integrally molded and formed by housing 12 and is concentric with tubular projection 40. Sufficient clearance is provided between the outer diameter of adjustment nut 16 and the internal diameter of bore 62 to permit the adjustment nut to rotate and be freely guided therein.

The head of screw 18 has a bottom surface 63 which overlaps the outer transverse face of adjustment nut 16 and serves to axially retain adjustment nut 16 in bore 62. The length of adjustment nut 16 exceeds the depth of bore 62 an amount sufficient to permit bottom surface 63 to frictionally lock adjustment nut 16 against rotational movement.

An annular groove 64 is formed in the outer surface of adjustment nut 16 adjacent closed end portion 58. A seal ring 66 is received in groove 64 and sealingly engages the diameter of groove 64 and the internal surface of bore 62. Fluid in passageway 34 can thus flow around control member 14 and through guide slot 42 without escape to the atmosphere and detrimental effect on control valve operation.

In operation, control member 14 is advanced or retracted by rotating adjustment nut 16 in the appropriate direction which causes internal thread 60 to react against threaded edges 48 and 50 of control member 14. Since slot 42 prevents rotation of control member 14, member 14 is advanced or retracted relative to passageway 34. To increasingly block passage 34 adjustment nut 16 is rotated until chamfered edges 52 and 54 (Ref. FIG. 3) abut the internal wall of passageway 34. In this position the restriction to flow caused by control member 14 is at a maximum value. However, it will be understood that the shape of control member 14 and the width of slot 42 can be varied, to achieve total shut-off in the fully advanced position, or to permit at least a minimum predetermined amount of flow to pass through the valve, whichever is desired in a given application. Subsequently, when increased flow is required, locking screw 18 is loosened enough to permit adjustment nut 16 to rotate freely. Adjustment nut 16 is then rotated a desired amount resulting in retraction of control member 14 from passageway 34, thereby increasing the effective flow area through passageway 34. FIG. 4 illustrates the control member 14 in a completely retracted, or open, position.

Modifications and variations of the preferred embodiment will occur to others upon a reading of the specification and it is my intention to include all such modifications and alterations insofar as they come within the scope of the appended claims.

What is claimed is:

1. An adjustable flow control valve, comprising:
    (a) housing means defining a fluid passageway having an inlet and an outlet;
    (b) control means movable between a first position within said fluid passageway in which the effective flow area of said fluid passageway is restricted to a predetermined minimum value, and a second position in which the flow area is substantially unobstructed;
    (c) said housing means including means defining a first guide surface aligned substantially transversely with said passageway and in fluid communication therewith, said control means being in sliding registration with said first guide surface, said first guide surface preventing rotation of said control member therein;
    (d) said housing means defining a second guide surface aligned substantially transversely with said passageway, said second guide surface having an annular configuration and surrounding said first guide surface and opening to the exterior of said housing means;
    (e) adjustment means rotatably received in contact with said second guide surface, said adjustment means being operatively connected to said control means, whereupon selective rotation of said adjustment means is effective for moving said control means between said first and second positions; and,
    (f) means selectively operable to prevent axial and rotational movement of said adjustment means with respect to said housing means.
2. The valve as defined in claim 1, wherein
    (a) said control means includes an elongated member having a generally elongated transverse section, said member having its longitudinal edges threaded;
    (b) said means defining said first guide surface comprises a projection extending transversely with respect to said flow passage with said first guide surface formed by the opposed parallel surfaces of a longitudinally extending slot through said projection with said elongated control member having the longitudinal threaded edges thereof extending through said slot;
    (c) said adjustment means includes a hollow member having the inner periphery thereof threaded for engagement with the threaded edges of said control member.
3. A valve as defined in claim 1, wherein
    (a) said adjustment means includes a member having a hollow tubular configuration with one end open and received over said means defining said first guide surface.
4. A valve as defined in claim 1, wherein
    (a) said adjustment means includes a member having a hollow tubular configuration and one end closed and seal means mounted adjacent the closed end thereof for sealingly engaging against the outer periphery of said tubular member and said second guide surface means.
5. An adjustable flow control valve comprising:
    (a) housing means defining a fluid passageway having an inlet and outlet, said housing means including means defining a first guide surface aligned substantially transversely with said passageway and in fluid communication therewith, said housing means further including means defining a second guide surface disposed substantially transversely with said passageway and having an annular configuration surrounding said first guide surface;
    (b) control means including a member slidable contacting said first guide surface and movable between a first position restricting the flow area of said passageway by a predetermined amount and a second position in which the flow area is substantially unrestricted, said second guide surface being operative to prevent rotation of said control means; and, (c) adjustment means rotatably contacting said second guide surface, said adjustment means being operable upon selective rotation thereof with respect to said first guide surface for moving said control means between said first and second positions.

6. An adjustable flow control valve, comprising:

(a) housing means defining a fluid passageway having an inlet and an outlet;

(b) control means movable between a first position within said fluid passageway in which the effective flow area of said fuid passageway is restricted to a predetermined minimum value, and a second position in which the flow area is substantially unobstructed;

(c) said housing means including means defining a first guide surface aligned substantially transversely with said passageway and in fluid communication therewith, said means defining said guide surface comprising a projection extending transversely with respect to said flow passage with said first guide surface formed by a slot having spaced parallel surfaces extending longitudinally through said projection, said control means being in sliding registration with said first guide surface, said first guide surface being configured to prevent rotation of said control means therein;

(d) said housing means defining a second guide surface aligned substantially transversely with said passageway, said second guide surface having an annular configuration and surrounding said first guide surface substantially coextensive with said tubular projection, said second guide surface opening through the exterior of said housing means;

(e) adjustment means rotatably received in contact with said second guide surface, said adjustment means being operatively connected to said control means, whereupon selective rotation of said adjustment means is effective for moving said control means between said first and second positions; and (f) means selectively operable to prevent axial and rotational movement of said adjustment means with respect to said housing means.

* * * * *